May 11, 1937.  A. WOLLENSAK ET AL  2,079,890
PRISM BINOCULAR
Filed Jan. 16, 1936  2 Sheets-Sheet 1

INVENTOR
ANDREW WOLLENSAK
GUSTAV F. PIRWITZ
BY Harold E. Stonebraker
ATTORNEY

May 11, 1937.  A. WOLLENSAK ET AL  2,079,890
PRISM BINOCULAR
Filed Jan. 16, 1936  2 Sheets-Sheet 2

INVENTOR
ANDREW WOLLENSAK
GUSTAV F. PIRWITZ
BY Harold E. Stonebraker
ATTORNEY

Patented May 11, 1937

2,079,890

UNITED STATES PATENT OFFICE 2,079,890

PRISM BINOCULAR

Andrew Wollensak and Gustav F. Pirwitz, Rochester, N. Y., assignors to Wollensak Optical Company, Rochester, N. Y., a corporation of New York Application January 16, 1936, Serial No. 59,431

2 Claims. (Cl. 88—33)

This invention relates to a prism binocular, and has for its object to afford a simple, economical, and improved construction that facilitates positioning and adjusting the prisms and optical systems, and makes possible easy access to the prisms, prism support and optical systems by means of a prism enclosing housing which is removable and positionable after the prisms and optical systems are permanently located on their support.

In prior types of construction, the enclosing housing has been constructed integrally with the body portion that carries the hinge members, or otherwise arranged, so that it has been necessary to insert the prisms through one or both ends of the housing and position and adjust them within the housing, and it is a more particular object of the present invention to remove the objections to these former structures by utilizing a housing that surrounds and encloses the prisms and optical systems, and which is not assembled in operative position until after the prisms and optical systems are permanently adjusted.

A further object of the invention is to construct the body portion and prism support in such a way as to facilitate machining the latter so as to insure accurate and uniform surfaces on both prism supports of a binocular, thus improving the efficiency and quality of the instrument.

A further object of the invention is to afford simple and improved means for adjusting the prisms on their support in relation to the optical system and retaining them permanently in such adjusted position, so as to prevent any inaccuracy in the instrument after continued use.

To these and other ends, the invention consists in the construction and arrangement of parts that will appear more clearly from the following description when read in conjunction with the accompanying drawings, the novel features being pointed out in the claims at the end of the specification.

Figure 1:
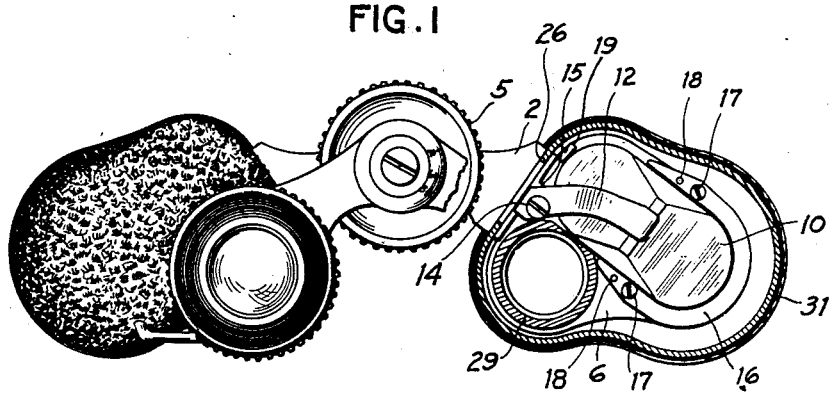
Fig. 1 is an end elevation of a binocular, one eyepiece being broken away and one housing removed.
Figure 2:
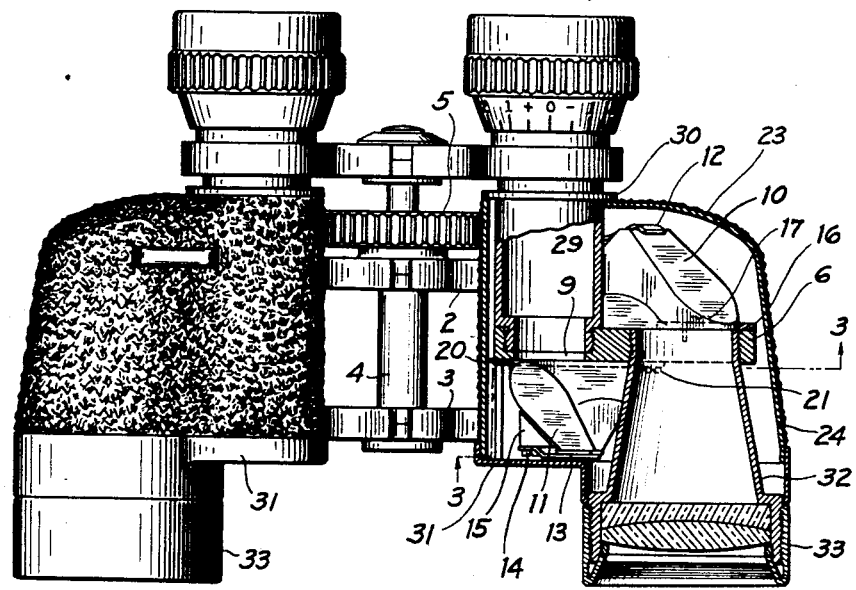
Fig. 2 is a side elevation of the same, showing one prism support and its related parts in section.

Referring more particularly to the drawings, which illustrate one practical embodiment of the invention, and in which like reference characters refer to the same parts throughout the several views, the structure, similarly to conventional binoculars, includes two units which are hinged together for swinging adjustment to vary the distance between the eyepieces to accommodate different pupillary distances, and each of said hinged units comprises a body including a central portion 1 provided with hinge members 2 and 3 at its ends which are adapted to be connected to the center post 4 for adjustment by a knurled wheel 5, as usual in this type of construction.

The body portion also carries a prism support 6, which is preferably formed integral with the central portion 1 and hinge members 2 and 3, said prism support 6 being provided with openings 7, 8 and 9 to permit passage of light therethrough from one prism to the other. The prisms 10 and 11 are secured to opposite surfaces of the prism support 6, as shown, and are held against movement away from the support by means of spring members 12 and 13 which are secured by screws 14 to the bosses 15 formed integral with the body, and having threaded openings to receive the screws 14 while the free ends of the spring members engage the outermost points of the prisms.

Figure 7:
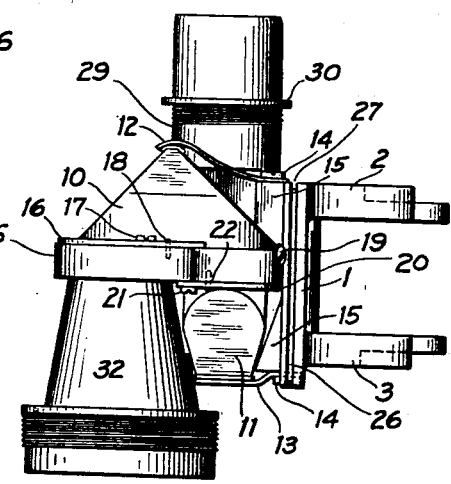
Fig. 7 is a detail side elevation looking from the rear of Fig. 2 and with the housing and eyepiece removed.

The prisms are held against sliding movement on the support by suitable retaining bands, the upper prism 10 being held in place by the band 16, see Fig. 1, which has a circular prism-engaging portion and is held on the support by screws 17. The retaining band 16 is adjustable with reference to the screws 17 to permit moving the prism on the support until its correct position is determined, and the screws 17 are then tightened to hold the band 16 and the prism in such position of adjustment. The prism retaining band 16 is then permanently located by driving suitable pins through openings 18 of the band into the prism support, and by this means the prism is permanently held and accidental displacement is prevented. For further adjustment of the prism 10 endwise on its support, a screw 19 is provided, see Fig. 7, which is threaded into the edge of the prism support, the head of the screw extending slightly above the support and acting as a stop against which the end of the prism abuts.

Figure 6:
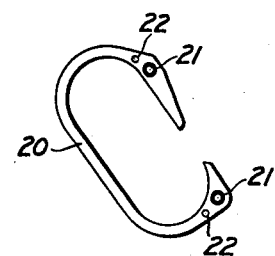
Fig. 6 is a detail view in elevation of one of the prism retaining bands.

A slightly different construction is utilized for positioning the lower prism 11, in this instance a band 20, see Fig. 6, being employed which has a circular prism-engaging portion at each end, both ends of the prism being held by the band 20 which is adjustable on the support with reference to the attaching screws 21 to permit locating the prism in the correct position. When thus adjusted, the screws 21 are tightly secured to the support, and pins are driven through the openings 22 into the support and act to hold the prism permanently in its correctly adjusted position on the support.

Figure 3:
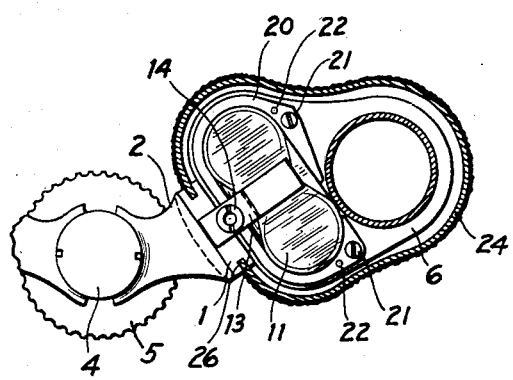
Fig. 3 is a horizontal sectional view on line 3—3 of Fig. 2.
Figure 5:
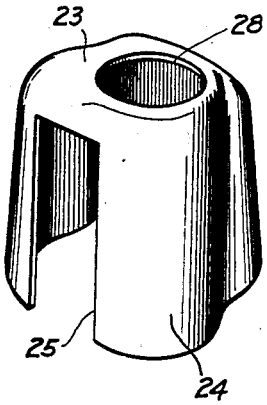
Fig. 5 is a perspective view of one of the housings removed.

The prisms are first adjusted on the support and thereafter an enclosing housing is secured in place around the prisms and prism support. The housing referred to is cylindrical-like in formation, as shown in Figs. 3 and 5, and includes an end wall 23 and side walls 24, each housing having a cross-sectional contour, as indicated in Fig. 3, such as to surround and conform to the cross-sectional contour of the prism and prism support assembly.

The housing is removably positionable on the body or prism support, and this is preferably accomplished by providing a cut-away portion 25 in one of the side walls of the housing, affording guides which engage the guideways 26 that are formed in the edges of the central portion 1 of the body. The housing is assembled by engaging the recessed portion with the guideways 26 and sliding it endwise, the edge at the end of the recess 25 engaging the guideway 27 at one end of the central portion 1 and thus affording a close, tight fit with the body. In this manner, the prisms and prism support are completely housed after the prisms are assembled and adjusted permanently on their support, and it will be understood that the housing 24 is suitably ornamented on its exterior surface to afford a pleasing finish for the exterior of the case.

The opening 28 provided in one end of the housing passes over the light barrel 29 which is threaded into the opening 9 of the prism support 6, and 30 is a retaining ring threaded on the light barrel 29 and acting to hold the housing in place. After the housing is positioned, the eyepiece assembly is secured over the light barrel 29 in the usual manner. The opposite end of the housing is enclosed by a cover plate 31 which fits around the objective barrel 32 and is held in place by the retaining ring 33.

Figure 4:
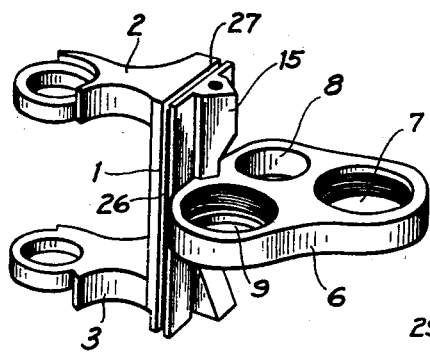
Fig. 4 is a perspective view of one hinged body and prism supporting unit.

In utilizing a construction of this type, a pair of bodies, one of which appears in Fig. 4, may be hinged together and the opposite surfaces of the prism supports machined at the same time in a lathe, thus insuring conformity between the surfaces of both prism supports of a binocular and extreme accuracy, owing to the fact that the prism supports are integral parts of the bodies, and there are no housings or other parts present to interfere with the machining operation. After the surfaces of the prism supports are properly machined, the prisms can be attached and adjusted until their correct relationships are had, and they are then permanently secured to the support in the manner already described, following which the enclosing housing is positioned around the prisms and prism support and attached to the body, and the cover plate at one end also put in place.

This construction and arrangement makes possible a procedure that greatly simplifies assembly of the prisms, and produces a more accurate instrument than heretofore at a lower cost.

While the invention has been described with reference to certain details of construction, it is not confined to the particular form herein disclosed, and this application is intended to cover any modifications or departures designed to accomplish the same purposes and coming within the scope of the following claims.

We claim:

1. In a prism binocular, the combination with a body including an integral central portion and integral hinge portions at the ends thereof, said central portion having guideways along two sides and one end thereof, of a prism support carried by said central portion, prisms secured to opposite sides of the prism support, and a housing having an end wall and side walls of sufficient length to enclose said prisms, the housing having a cut-away portion in one of its side walls, the edges surrounding said cut-away portion being engageable with the aforesaid guideways to permit removably positioning the housing on said central portion of the body.

2. In a prism binocular, the combination with a body including an integral central portion having guideways along two sides and one end thereof, integral hinge portions at the ends, an oppositely extending integral prism support intermediate said ends, prisms secured on opposite sides of the prism support, and a housing having an end wall and side walls of sufficient length to enclose said prisms, one of said side walls being cut-away to afford edges engageable with the aforesaid guideways in the central portion of the body whereby the housing is removably associated with said body by an endwise sliding movement.

ANDREW WOLLENSAK.
GUSTAV F. PIRWITZ.